United States Patent
Cheng (10) Patent No.: US 10,409,482 B2
(45) Date of Patent: Sep. 10, 2019

(54) ELECTRONIC SYSTEM, TOUCH SENSITIVE PROCESSING APPARATUS AND METHOD THEREOF FOR SWITCHING TO NORMAL OPERATION MODE UPON RECEIVING TOUCH GESTURE IN POWER SAVING MODE

(71) Applicant: EGALAX_EMPIA TECHNOLOGY INC., Taipei (TW)

(72) Inventor: Kai-Yu Cheng, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/719,844

(22) Filed: Sep. 29, 2017

(65) Prior Publication Data

US 2018/0107373 A1 Apr. 19, 2018

Related U.S. Application Data

(60) Provisional application No. 62/402,277, filed on Sep. 30, 2016.

(51) Int. Cl.
*G06F 3/0488* (2013.01)
*G06F 1/3218* (2019.01)
(Continued)

(52) U.S. Cl.
CPC ........ *G06F 3/04883* (2013.01); *G06F 1/3215* (2013.01); *G06F 1/3218* (2013.01);
(Continued)

(58) Field of Classification Search
CPC .... G06F 1/3203; G06F 1/3215; G06F 1/3218; G06F 1/3262; G06F 3/03545;
(Continued)

(56) References Cited

U.S. PATENT DOCUMENTS

| | | | | |
|---|---|---|---|---|
| 5,974,558 A | * | 10/1999 | Cortopassi | ............ G06F 1/1613 713/323 |
| 2005/0078093 A1 | * | 4/2005 | Peterson, Jr. | ......... G06F 1/3203 345/173 |

(Continued)

FOREIGN PATENT DOCUMENTS

| | | |
|---|---|---|
| TW | 201032115 | 9/2010 |
| TW | 201409293 | 3/2014 |

*Primary Examiner* — Michael J Eurice
(74) *Attorney, Agent, or Firm* — WPAT, PC (57) ABSTRACT

The present invention provides a touch sensitive processing method for switch an electronic system into a normal operation mode upon receiving a touch gesture in a power saving mode. The electronic system includes a host and a power supply module. The host is configured to execute an operating system to control the electronic system in the normal operation mode. The power supply module is configured to supply power to the host in the normal operation mode and to cut power supply to the host in the power saving mode. The touch sensitive processing method includes: detecting multiple touch events via multiple touch sensitive electrodes of a touch panel; determining whether a power-on command is formed by these touch events; and sending a power-on notification to the power supply module for supplying power to the host and switching to the normal operation mode when the power-on command is formed by these touch events.

32 Claims, 3 Drawing Sheets

(51) Int. Cl.
*G06F 3/041* (2006.01)
*G06F 1/3215* (2019.01)
*G06F 1/3234* (2019.01)

(52) U.S. Cl.
CPC .......... *G06F 3/0416* (2013.01); *G06F 1/3262* (2013.01); *G06F 2203/04104* (2013.01); *G06F 2203/04808* (2013.01)

(58) Field of Classification Search
CPC ............... G06F 3/0416; G06F 3/04883; G06F 3/04886; G06F 2203/04808; G06F 2203/04104; G09G 2330/021
See application file for complete search history.

(56) References Cited

U.S. PATENT DOCUMENTS

| | | | |
|---|---|---|---|
| 2008/0062140 A1* | 3/2008 | Hotelling | G09G 3/3648 345/173 |
| 2009/0139778 A1* | 6/2009 | Butler | G06F 1/1626 178/18.03 |
| 2010/0214254 A1* | 8/2010 | Tsai | G06F 1/3215 345/174 |
| 2011/0193809 A1* | 8/2011 | Walley | G06F 3/044 345/173 |
| 2011/0261074 A1* | 10/2011 | Sasama | G06F 1/3215 345/634 |
| 2012/0032894 A1* | 2/2012 | Parivar | G06F 1/3215 345/173 |
| 2012/0056841 A1* | 3/2012 | Krenik | G06F 3/0418 345/174 |
| 2012/0062497 A1* | 3/2012 | Rebeschi | G06F 3/03545 345/174 |
| 2012/0062498 A1* | 3/2012 | Weaver | G06F 3/03545 345/174 |
| 2012/0075240 A1* | 3/2012 | Kida | G06F 3/044 345/174 |
| 2012/0200532 A1* | 8/2012 | Powell | G06F 3/0414 345/175 |
| 2013/0012273 A1* | 1/2013 | Sato | G06F 1/1624 455/566 |
| 2013/0027290 A1* | 1/2013 | Wong | G06F 3/04886 345/156 |
| 2013/0050116 A1* | 2/2013 | Shin | G06F 3/044 345/173 |
| 2013/0069897 A1* | 3/2013 | Liu | G06F 3/0488 345/173 |
| 2013/0222285 A1* | 8/2013 | Lee | G06F 3/017 345/173 |
| 2013/0222288 A1* | 8/2013 | Lim | G06F 3/041 345/173 |
| 2013/0222295 A1* | 8/2013 | Lim | G06F 3/041 345/173 |
| 2013/0265276 A1* | 10/2013 | Obeidat | G06F 3/044 345/174 |
| 2014/0062907 A1* | 3/2014 | Kim | G06F 3/038 345/173 |
| 2014/0191999 A1* | 7/2014 | Kim | G06F 1/1616 345/173 |
| 2014/0201827 A1* | 7/2014 | Okazaki | G06F 1/1616 726/7 |
| 2014/0221051 A1* | 8/2014 | Oguri | H04W 52/0254 455/566 |
| 2014/0232691 A1* | 8/2014 | Lee | G06F 3/044 345/174 |
| 2014/0320451 A1* | 10/2014 | Lee | G06F 3/0418 345/174 |
| 2014/0362028 A1* | 12/2014 | Mo | G06F 3/044 345/174 |
| 2015/0022485 A1* | 1/2015 | Chen | G06F 3/0416 345/174 |
| 2015/0091858 A1* | 4/2015 | Rosenberg | G06F 3/0414 345/174 |
| 2015/0091859 A1* | 4/2015 | Rosenberg | G06F 3/044 345/174 |
| 2015/0097808 A1* | 4/2015 | Roh | G06F 3/0412 345/174 |
| 2015/0253928 A1* | 9/2015 | Yamanaka | G06F 3/0421 345/175 |
| 2015/0301577 A1* | 10/2015 | Leigh | G06F 3/041 345/174 |
| 2015/0331504 A1* | 11/2015 | Chen | G06F 3/046 345/174 |
| 2016/0103476 A1* | 4/2016 | Kim | G06F 3/038 345/1.3 |
| 2016/0104461 A1* | 4/2016 | Gao | G04G 9/0005 345/545 |
| 2016/0179258 A1* | 6/2016 | Fan | G06F 1/06 345/173 |
| 2016/0209907 A1* | 7/2016 | Han | G06F 1/3209 |
| 2016/0248894 A1* | 8/2016 | Hosoi | H04M 1/03 |
| 2017/0090619 A1* | 3/2017 | Yousefpor | G06F 3/044 |
| 2017/0131798 A1* | 5/2017 | Geaghan | G06F 3/044 |
| 2017/0235410 A1* | 8/2017 | Costa | G06F 3/044 345/174 |
| 2017/0295269 A1* | 10/2017 | Hosoi | H04M 1/02 |
| 2018/0004347 A1* | 1/2018 | Guedon | G06F 3/0418 |
| 2018/0059838 A1* | 3/2018 | Chung | G02F 1/13338 |
| 2018/0059870 A1* | 3/2018 | Krah | G06F 3/0418 |
| 2018/0081488 A1* | 3/2018 | Lee | G06F 3/0416 |
| 2018/0275824 A1* | 9/2018 | Li | G06F 3/044 |

* cited by examiner

ELECTRONIC SYSTEM, TOUCH SENSITIVE PROCESSING APPARATUS AND METHOD THEREOF FOR SWITCHING TO NORMAL OPERATION MODE UPON RECEIVING TOUCH GESTURE IN POWER SAVING MODE

CROSS REFERENCE TO RELATED APPLICATIONS

This application claims priority benefits of U.S. provisional patent application 62/402,277, filed on Sep. 30, 2016.

FIELD OF THE INVENTION

The present application is related to an electronic system having a touch panel, and more particularly, to an electronic system for switching to a normal operation mode upon receiving a touch gesture in a power saving mode.

BACKGROUND OF THE INVENTION

Modern electronic devices usually use electronic switches instead of mechanical switches to turn on/off their internal system operations. This prevents reliability reduction due to wear and tear of the mechanical switches. A typical mechanical or electronic switch is used as an on/off button. Under the demands for ever smaller and waterproof electronic devices, human factors and the above considerations need to be taken into account when providing an on/off button on the casing of an electronic device. Therefore, if an electronic device can use its existing input device to turn on/off its system operation, then a dedicated system on/off button can be omitted. This not only eliminates the mechanical structure and the associated circuit design, but also makes the device more aesthetically pleasing as well as having increased waterproof ability and higher casing strength.

Therefore, there is a need in the industry for an electronic system that is capable of receiving a power-on command formed by a touch gesture via a touch sensitive area of a touch panel or a touch screen in a power saving mode and then switching from the power saving mode to a normal operation mode that consumes more power.

SUMMARY OF THE INVENTION

In an embodiment of the present invention, an electronic system for switching to a normal operation mode upon receiving a touch gesture in a power saving mode is provided. The electronic system includes: a host for executing an operating system to control the electronic system in the normal operation mode; a power supply module for supplying power to the host in the normal operation mode and to cut power supply to the host in the power saving mode; and a touch sensitive processing apparatus for receiving power provided by the power supply module in the power saving mode, the touch sensitive processing apparatus including an electrode interface component for connecting with a plurality of touch sensitive electrodes of a touch panel for detecting multiple touch events via the multiple touch sensitive electrodes; and a processor for determining whether a power-on command is formed by these touch events, and sending a power-on notification to the power supply module for supplying power to the host and switching to the normal operation mode when the power-on command is formed by these touch events. Accordingly, this embodiment allows the electronic system in a power saving mode to receive touch gestures in order to switch to a normal operation mode.

In an embodiment of the present invention, a touch sensitive processing apparatus for switching an electronic system into a normal operation mode upon receiving a touch gesture in a power saving mode is provided. The electronic system includes a host and a power supply module. The host is configured for executing an operating system to control the electronic system in the normal operation mode. The power supply module is configured for supplying power to the host in the normal operation mode and to cut power supply to the host in the power saving mode. The touch sensitive processing apparatus includes an electrode interface component for connecting with a plurality of touch sensitive electrodes of a touch panel for detecting multiple touch events via the multiple touch sensitive electrodes; and a processor for determining whether a power-on command is formed by these touch events, and sending a power-on notification to the power supply module for supplying power to the host and switching to the normal operation mode when the power-on command is formed by these touch events. Accordingly, this embodiment allows the electronic system in a power saving mode to receive touch gestures in order to switch the electronic system into a normal operation mode.

In an embodiment of the present invention, a touch sensitive processing method for switching an electronic system into a normal operation mode upon receiving a touch gesture in a power saving mode is provided. The electronic system includes a host and a power supply module. The host is configured for executing an operating system to control the electronic system in the normal operation mode. The power supply module is configured for supplying power to the host in the normal operation mode and to cut power supply to the host in the power saving mode. The touch sensitive processing method includes: detecting multiple touch events via multiple touch sensitive electrodes on a touch panel; determining whether a power-on command is formed by these touch events; and sending a power-on notification to the power supply module for supplying power to the host and switching to the normal operation mode when the power-on command is formed by these touch events. Accordingly, this embodiment allows the electronic system in a power saving mode to receive touch gestures in order to switch the electronic system into a normal operation mode.

As a result, the electronic system, the touch sensitive processing apparatus and method for the same provided by the present invention is capable of receiving a power-on command formed by a touch gesture on a touch sensitive area of a touch panel or a touch screen in a power saving mode, and switching the electronic system from the power saving mode into a normal operation mode that consumes more power.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1:
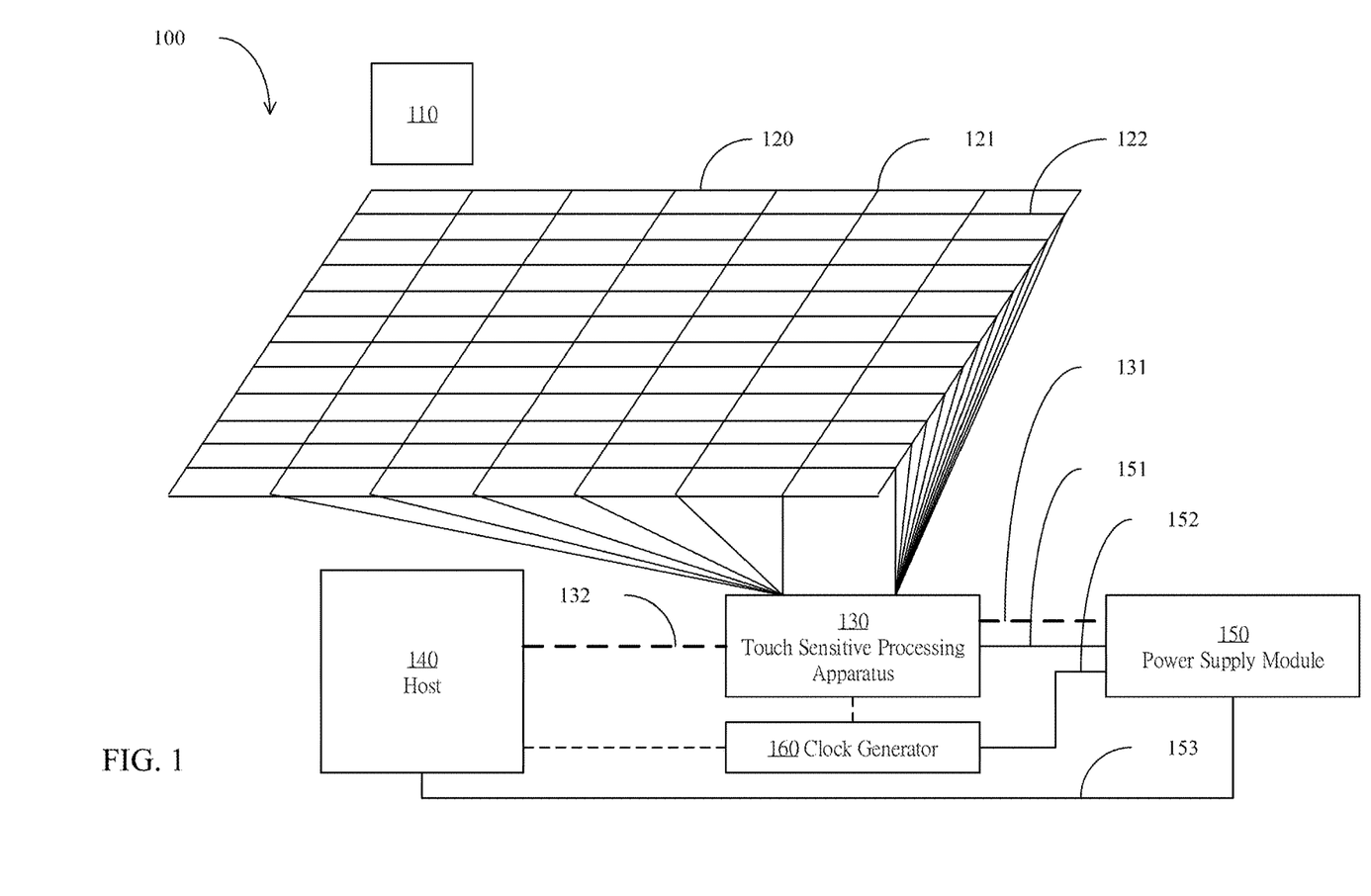
FIG. 1 is a schematic diagram depicting the system framework of an electronic system in accordance with an embodiment of the present invention.

Referring to FIG. 1, a schematic diagram depicting the system framework of an electronic system 100 in accordance with an embodiment of the present invention is shown. The electronic system 100 includes an optional stylus 110, a touch panel 120, a touch sensitive processing apparatus 130 connected to the touch panel 120, a host 140 connected to the touch sensitive processing apparatus 130, a clock generator 160 for providing a clock signal to the touch sensitive processing apparatus 130 and the host 140, and a power supply module 150 for providing power to the touch sensitive processing apparatus 130, the host 140 and the clock generator 160.

The touch panel 120 can be a simple touch panel or a touch screen capable of displaying contents controlled by the host 140. The touch panel 120 may include a plurality of parallel first electrodes 121 and a plurality of parallel second electrodes 122. The first electrodes 121 and the second electrodes 122 may form a plurality of intersecting sensing areas, and are connected to the touch sensitive processing apparatus 130.

The host 140 can be implemented using a plurality of computer frameworks. In an embodiment, it adopts a personal computer framework, including, for example, a CPU, a memory, a Northbridge, a Southbridge, a storage device such as a hard disk, a keyboard and a mouse. The touch sensitive processing apparatus 130 may be connected to the host 140 via a host interface 132. For example, the host interface 132 may be a PCI, PCI Express, or I2C interface or the like for connecting to the Southbridge. In another embodiment, the host 140 adopts a smart computer framework, including, for example, an application program processor, a modem processor, a memory, a USB master, a flash memory chip, a camera, a microphone and etc. In this example, the host interface may be a USB, I2C or UART interface or the like for connecting directly to the application program processor, or the USB master. When the host 140 is powered on, the touch sensitive processing apparatus 130 can then use the first electrodes 121 and the second electrodes 122 to detect any external conductive objects, such as the stylus 110 and/or fingers or the like, on the touch panel 120, and report touch events to the host 140, an operating system or an application program executed by the host 140 via the host interface 132.

The clock generator 160 is used for supplying a clock signal to various components of the touch sensitive processing apparatus 130 and the host 140, and the power supply module 150 is used for supplying power to the touch sensitive processing apparatus 130, the clock generator 160 and the host 140 via power supply interfaces 151, 152 and 153, respectively. The power supply module 150 may be powered by batteries or AC power supply. The power supply module 150 may include transformers and a power supply bus for controlling power supply via the power supply interfaces 151, 152 and 153.

When the electronic system 100 is turned off, most of the components of the host 140 do not use power and the clock signal. At this time, the touch sensitive processing apparatus 130 and the clock generator 160 still obtain power via the power supply interfaces 151 and 152, and the touch sensitive processing apparatus 130 still obtains the clock signal from the clock generator 160.

When the host 140 is turned off, the touch sensitive processing apparatus 130 still periodically checks for external conductive objects (e.g. the stylus 110 and/or fingers) on the touch panel 120 using the first electrodes 121 and the second electrodes 122. The touch sensitive processing apparatus 130 not only detects the location or the status of an external conductive object or the stylus 110, but also determines if a power-on command is received from a user based on multiple touch events. When the touch sensitive processing apparatus 130 determines a power-on command is received, it then notifies the power supply module 150 via a power switch interface 131. The power supply module 150 then provides power and necessary commands to the host 140 via the power supply interface 153. System power-on of the electronic system 100 can then be performed according to a power-on sequence of the host 140.

In an embodiment, when the host 140 is turned off, the touch sensitive processing apparatus 130 may operate at a lower clock frequency to save power. The clock generator 160 may also provide a clock signal with a lower frequency to save power. Once the host 140 is turned on, the touch sensitive processing apparatus 130 may operate at a higher clock frequency to provide a better service for reporting touch events.

In an embodiment, when the host 140 is turned off, the touch sensitive processing apparatus 130 may turn off some of the components to save power. For example, the touch sensitive processing apparatus 130 may turn off parts of a processor unit, part of a memory, parts of a flash memory, parts of an electrode connecting interface etc. Once the host 140 is turned on, the touch sensitive processing apparatus 130 may resume operations of these turned off components to provide a better service for reporting touch events.

In an embodiment, when the host 140 is turned off, the touch sensitive processing apparatus 130 may have a lower detection/reporting rate for touch events than when the host is turned on.

In an embodiment, when the host 140 is turned off, the touch sensitive processing apparatus 130 may use fewer first electrodes 121 and second electrodes 122 for detection in order to save power. In an example, only first electrodes 121 and second electrodes 122 in the center area or other areas of the touch panel 120 are used for detection instead of all of the first electrodes 121 and second electrodes 122. In another example, every other or every several first electrodes 121 and/or second electrodes 122 are used for detection to save power. Although the accuracy of a location of a touch event is lower due to fewer electrodes being used for detection, it is acceptable as long as a user power-on command can be recognized.

In an embodiment, when the host 140 is turned off, the touch sensitive processing apparatus 130 may use a poorer detection mode to save power. For example, when the host 140 is turned on, the touch sensitive processing apparatus 130 can detect the gestures of several fingers. On the other hand, when the host 140 is turned off, the touch sensitive processing apparatus 130 can detect only the gesture of one or two fingers. Naturally, as the amount of computation of the touch sensitive processing apparatus 130 is reduced, power consumption is reduced.

In an embodiment, when the host 140 is turned off, the touch sensitive processing apparatus 130 may choose an approach with lower detection performance to save power.

For example, the touch sensitive processing apparatus 130 may provide a lower voltage to the touch sensitive electrodes or process signals of the touch sensitive electrodes using a lower amplifier gain. Once the host 140 is turned on, the touch sensitive processing apparatus 130 may provide a higher voltage to the touch sensitive electrodes or process signals of the touch sensitive electrodes using a higher amplifier gain.

Figure 2:
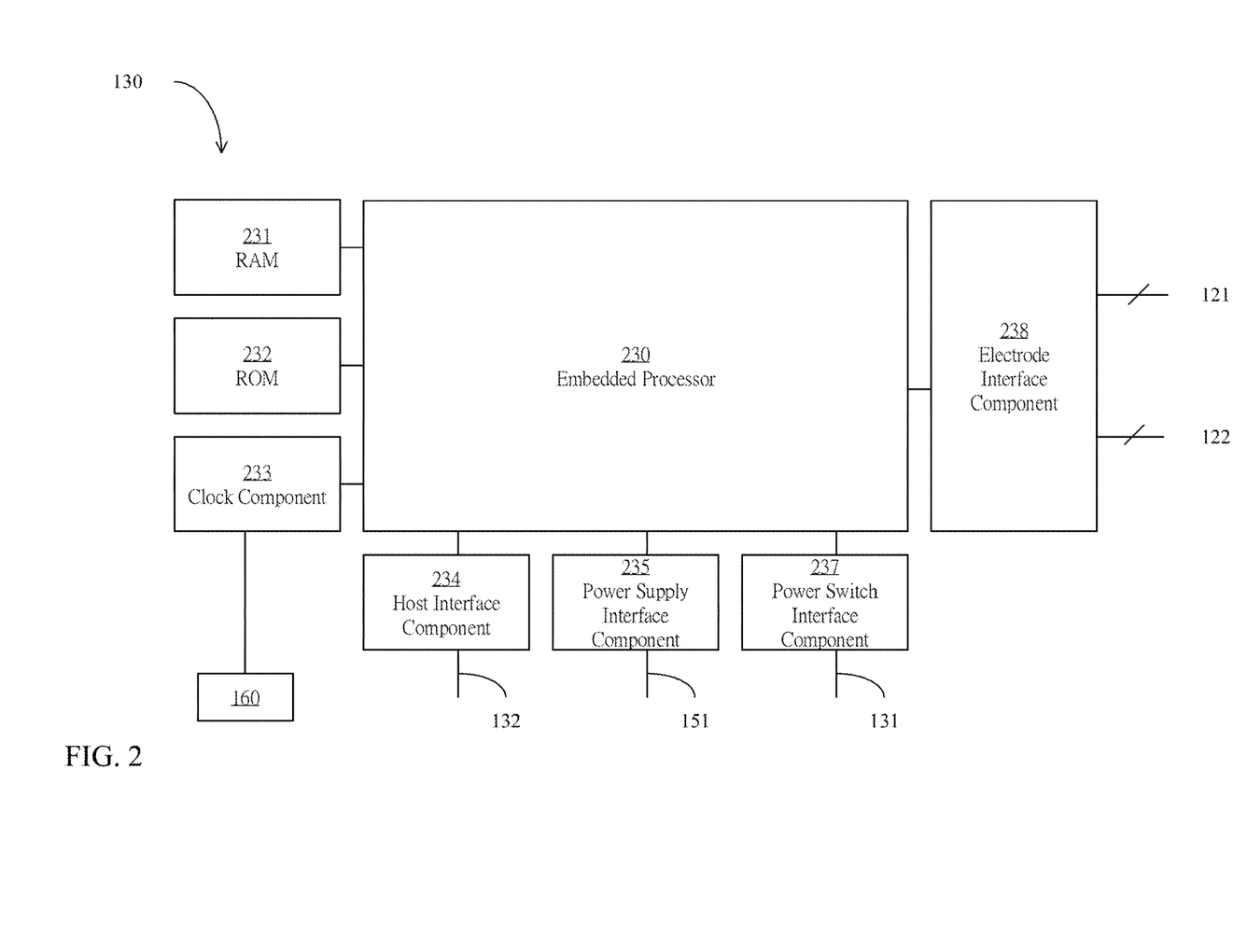
FIG. 2 is a block diagram depicting a touch sensitive processing apparatus in accordance with an embodiment of the present invention.

Referring to FIG. 2, a block diagram depicting the touch sensitive processing apparatus 130 in accordance with an embodiment of the present invention is shown. The touch sensitive processing apparatus 130 can be one or more integrated circuits formed into a single apparatus using various packaging techniques, and is installed in the electronic system 100. Its core can be an embedded processor 230 or an independent processor 230. The processor 230 is connected to a random access memory (RAM) 231 and a read-only memory (ROM) 232 for executing program codes in the ROM 232.

The touch sensitive processing apparatus 130 includes a clock component 233 for receiving the clock signal from the clock generator 160. The clock component 233 can increase or decrease the speed of the clock signal, for example, by multiplying or dividing by a certain number. The clock component 233 may include CXO, VCXO, TCXO and other components.

The touch sensitive processing apparatus 130 includes a host interface component 234 for connecting to the host interface 132 above. As described earlier, the host interface component 234 can be compatible with the host interface 132.

The touch sensitive processing apparatus 130 includes a power supply interface component 235 and a power switch interface component 237 that connect to the power supply module 150 via the power supply interface 151 and the power switch interface 131 described above, respectively. In addition, the touch sensitive processing apparatus 130 further includes an electrode interface component 238 that connects to the first electrodes 121 and the second electrodes 122 described above.

The processor 230 may execute an embedded operating system or a real-time operating system included in the ROM 232 in order to control operations of the various components 231-238 and implement the various embodiments described above.

Figure 3:
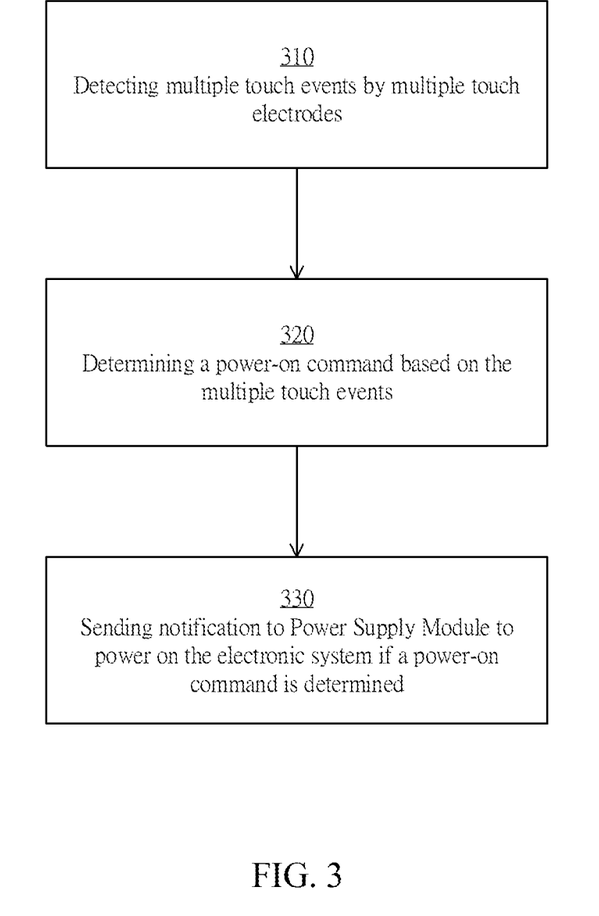
FIG. 3 is a flowchart illustrating a touch sensitive power-on method in accordance with an embodiment of the present invention.

Referring to FIG. 3, a flowchart illustrating a touch sensitive power-on method in accordance with an embodiment of the present invention is shown. The method can be executed by the touch sensitive processing apparatus 130 of FIG. 1 or 2.

Step 310: Detecting multiple touch events by multiple touch sensitive electrodes (e.g. the first electrodes 121 and the second electrodes 122 of FIG. 1) of a touch panel.

Step 320: Determining if a power-on command is input by a user based on the multiple touch events.

Step 330: Sending a power-on notification to a power supply module (e.g. the power supply module 150 of FIG. 1) if a power-on command is determined. In an example, the notification can also be sent to the host 140.

The determining process in step 320 may include many different implementations. In one embodiment, a power-on command is determined if the touch events form a specific gesture, for example, a circle-drawing gesture made with a finger, a zoom in/out gesture made with multiple fingers. These gestures can be gestures pre-defined in the touch sensitive processing apparatus, or defined by user.

In another embodiment, a power-on command is determined by determining if the touch events include touch selections in certain locations, for example, click events in the same area three consecutive times, or click events at the four corners of the touch panel sequentially etc. Similarly, these click events can be pre-defined in the touch sensitive processing apparatus or defined by users.

The power-on command is formed by one or more sequential gestures and/or click events. The order of the gestures and/or click events corresponding to multiple power-on commands can also be defined. As long as the power-on command is distinguishable from inadvertently touching, the power-on command is guaranteed to come from a user deliberately.

In an embodiment, the touch sensitive processing apparatus 130 has its own built-in clock generator, so when the electronic system 100 is turned off, the clock generator 160 will also be turned off along with the electronic system 100.

In an embodiment, regardless of whether the electronic system 100 is turned off, the touch sensitive processing apparatus 130 continues to send coordinates detected via the host interface 132.

In an embodiment, the touch sensitive processing apparatus 130 only sends coordinates detected via the host interface 132 when the electronic system 100 is not turned off.

In an embodiment, the above operating system can be the power supply module 150 providing power and necessary commands or signals to the host 140 via the power supply interface 153, so that the host 140 can perform power-on operation according to a power-on sequence. On the contrary, the power supply module 150 may provide a power-off signal to the host 140, so that the host 140 can perform a power-off operation according to a power-off sequence. The power supply module 150 may stop providing power to the power supply interface 153 after detecting the host 140 has shut down or receiving a power-off signal from the host 140. As mentioned before, if the touch sensitive processing apparatus 130 has its own built-in clock generator, the power supply module 150 may also stop providing power to the power supply interface 152. The power supply module 150 may provide the power-off signal once the touch sensitive processing apparatus 130 has detected a power-off command from the user.

The electronic system mentioned in the present invention can be, but is not limited to, a computing system such as a desktop computer, a laptop computer, a tablet PC, a smartphone and etc. The host and the processor mentioned in the present invention can be, but are not limited to, the x86 or the x64 system architecture available from Intel, the PA-RSIC system architecture available from HP, the AS400 system architecture available from IBM, or the ARM system architecture available from ARM. The operating system mentioned in the present invention can be, but is not limited to, Windows operating system available from Microsoft, Android operating system, HP-UX operating system, iOS operating system from Apple. The microprocessor mentioned in the present invention can be, but is not limited to, 8051 microprocessor series and i960 microprocessor series from Intel, ARM microprocessor series from ARM, MIPS series, AVR series from Atmel. The detecting circuit mentioned in the present invention can be part of a capacitive detecting circuit in a capacitive touch sensitive processing apparatus produced by the applicant or other companies. The drive circuit mentioned in the present invention can be part of a capacitive drive circuit in a capacitive touch sensitive processing apparatus produced by the applicant or other companies. Over billions of electronic apparatuses (e.g. smartphones) including capacitive touch sensitive processing apparatuses have been produced, therefore the applicant believe the detecting circuit, the drive circuit, the microprocessor, the processor, the host, and the operating system described above are well known to those with ordinary skills in the art.

In an embodiment of the present invention, an electronic system for switching to a normal operation mode upon receiving a touch gesture in a power saving mode is provided. The electronic system includes: a host for executing an operating system to control the electronic system in the normal operation mode; a power supply module for supplying power to the host in the normal operation mode and to cut power supply to the host in the power saving mode; and a touch sensitive processing apparatus for receiving power provided by the power supply module in the power saving mode. The touch sensitive processing apparatus includes an electrode interface component for connecting with a plurality of touch sensitive electrodes of a touch panel for detecting multiple touch events via the multiple touch sensitive electrodes; and a processor for determining whether a power-on command is formed by these touch events, and sending a power-on notification to the power supply module for supplying power to the host and switching to the normal operation mode when the power-on command is formed by these touch events. Accordingly, this embodiment allows the electronic system in a power saving mode to receive touch gestures in order to switch to a normal operation mode.

In a variant of the above embodiment, the electronic system further includes a clock generator for providing a first clock signal to the touch sensitive processing apparatus in the power saving mode, and providing a second clock signal to the touch sensitive processing apparatus in the normal operation mode, wherein the frequency of the first clock signal is lower than that of the second clock signal. Accordingly, this embodiment allows the touch sensitive processing apparatus to use less power in the power saving mode than in the normal operation mode.

In a variant of the above embodiment, a detection rate for detecting touch events for the touch sensitive processing apparatus in the power saving mode is lower than a detection rate for detecting touch events in the normal operation mode. Accordingly, as the amount of computation of the touch sensitive processing apparatus is reduced, power required for the touch sensitive electrodes to sense touch events in a unit time is also reduced, this embodiment thus allows the touch sensitive processing apparatus to use less power in the power saving mode than in the normal operation mode.

In a variant of the above embodiment, the touch sensitive processing apparatus uses less touch sensitive electrodes for detection in the power saving mode, and uses more touch sensitive electrodes for detection in the normal operation mode. In a variant of the above embodiment, the touch sensitive processing apparatus uses only touch sensitive electrodes within a specific area of the touch panel for detection in the power saving mode, and uses all of the touch sensitive electrodes for detection in the normal operation mode. In a variant of the above embodiment, the touch sensitive processing apparatus uses at least every other touch sensitive electrode for detection in the power saving mode, and uses all of the touch sensitive electrodes for detection in the normal operation mode. Accordingly, as the amount of touch sensitive electrodes used is reduced, power required for the touch sensitive electrodes to sense touch events is also reduced, this embodiment thus allows the touch sensitive processing apparatus to use less power in the power saving mode than in the normal operation mode.

In a variant of the above embodiment, the touch sensitive processing apparatus detects only gestures of a single finger in the power saving mode, and detects gestures of multiple fingers in the normal operation mode. Accordingly, as the amount of computation is reduced, this embodiment allows the touch sensitive processing apparatus to use less power in the power saving mode than in the normal operation mode.

In a variant of the above embodiment, the highest voltage of touch sensitive signals provided to the touch sensitive electrodes by the touch sensitive processing apparatus in the power saving mode is less than the highest voltage of touch sensitive signals provided to the touch sensitive electrodes by the touch sensitive processing apparatus in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the touch sensitive processing apparatus further includes an amplifier for amplifying signals from the touch sensitive electrodes. The gain of the amplifier is smaller in the power saving mode than in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the power-on command is a specific touch gesture defined by a user. Accordingly, this embodiment allows a user to define specific touch gestures for the electronic system to avoid other people switching the electronic system into the normal operation mode using a default touch gesture.

In a variant of the above embodiment, the power-on command is a sequence of the multiple touch events occurred in at least one area. Accordingly, this embodiment allows touch events inputted by a user to be limited to at least one area to reduce the number of touch sensitive electrodes required for detecting the touch events, such that the touch sensitive processing apparatus is capable of using less power in the power saving mode than in the normal operation mode.

In a variant of the above embodiment, the electronic system further includes a clock generator for providing a clock signal to the touch sensitive processing apparatus in the normal operation mode, wherein the touch sensitive processing apparatus further includes a clock component for self-providing a clock signal to the processor in the power saving mode. Accordingly, although the clock signal provided by the clock component is slower and less accurate, this embodiment allows the clock component that consumes less power to be used in lieu of the clock generator that consumes more power, such that the touch sensitive processing apparatus is capable of using less power in the power saving mode than in the normal operation mode.

In an embodiment of the present invention, a touch sensitive processing apparatus for switching an electronic system into a normal operation mode upon receiving a touch gesture in a power saving mode is provided. The electronic system includes a host and a power supply module. The host is configured for executing an operating system to control the electronic system in the normal operation mode. The power supply module is configured for supplying power to the host in the normal operation mode and to cut power supply to the host in the power saving mode. The touch sensitive processing apparatus includes an electrode interface component for connecting with a plurality of touch sensitive electrodes of a touch panel for detecting multiple touch events via the multiple touch sensitive electrodes; and a processor for determining whether a power-on command is formed by these touch events, and sending a power-on notification to the power supply module for supplying power to the host and switching to the normal operation mode when the power-on command is formed by these touch events. Accordingly, this embodiment allows the electronic system in a power saving mode to receive touch gestures in order to switch the electronic system into a normal operation mode.

In a variant of the above embodiment, the electronic system further includes a clock generator for providing a first clock signal to the touch sensitive processing apparatus in the power saving mode, and providing a second clock signal to the touch sensitive processing apparatus in the normal operation mode, wherein the frequency of the first clock signal is lower than that of the second clock signal. Accordingly, this embodiment allows the touch sensitive processing apparatus to use less power in the power saving mode than in the normal operation mode.

In a variant of the above embodiment, a detection rate for detecting touch events for the touch sensitive processing apparatus in the power saving mode is lower than a detection rate for detecting touch events in the normal operation mode. Accordingly, as the amount of computation of the touch sensitive processing apparatus is reduced, power required for the touch sensitive electrodes to sense touch events in a unit time is also reduced, this embodiment thus allows the touch sensitive processing apparatus to use less power in the power saving mode than in the normal operation mode.

In a variant of the above embodiment, the touch sensitive processing apparatus uses less touch sensitive electrodes for detection in the power saving mode, and uses more touch sensitive electrodes for detection in the normal operation mode. In a variant of the above embodiment, the touch sensitive processing apparatus uses only touch sensitive electrodes within a specific area of the touch panel for detection in the power saving mode, and uses all of the touch sensitive electrodes for detection in the normal operation mode. In a variant of the above embodiment, the touch sensitive processing apparatus uses at least every other touch sensitive electrode for detection in the power saving mode, and uses all of the touch sensitive electrodes for detection in the normal operation mode. Accordingly, as the amount of touch sensitive electrodes used is reduced, power required for the touch sensitive electrodes to sense touch events is also reduced, this embodiment thus allows the touch sensitive processing apparatus to use less power in the power saving mode than in the normal operation mode.

In a variant of the above embodiment, the touch sensitive processing apparatus detects only gestures of a single finger in the power saving mode, and detects gestures of multiple fingers in the normal operation mode. Accordingly, as the amount of computation is reduced, this embodiment allows the touch sensitive processing apparatus to use less power in the power saving mode than in the normal operation mode.

In a variant of the above embodiment, the highest voltage of touch sensitive signals provided to the touch sensitive electrodes by the touch sensitive processing apparatus in the power saving mode is less than the highest voltage of touch sensitive signals provided to the touch sensitive electrodes by the touch sensitive processing apparatus in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the touch sensitive processing apparatus further includes an amplifier for amplifying signals from the touch sensitive electrodes. The gain of the amplifier is smaller in the power saving mode than in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the power-on command is a specific touch gesture defined by a user. Accordingly, this embodiment allows a user to define specific touch gestures for the electronic system to avoid other people switching the electronic system into the normal operation mode using a default touch gesture.

In a variant of the above embodiment, the power-on command is a sequence of the multiple touch events occurred in at least one area. Accordingly, this embodiment allows touch events inputted by a user to be limited to at least one area to reduce the number of touch sensitive electrodes required for detecting the touch events, such that the touch sensitive processing apparatus is capable of using less power in the power saving mode than in the normal operation mode.

In a variant of the above embodiment, the electronic system further includes a clock generator for providing a clock signal to the touch sensitive processing apparatus in the normal operation mode, wherein the touch sensitive processing apparatus further includes a clock component for self-providing a clock signal to the processor in the power saving mode. Accordingly, although the clock signal provided by the clock component is slower and less accurate, this embodiment allows the clock component that consumes less power to be used in lieu of the clock generator that consumes more power, such that the touch sensitive processing apparatus is capable of using less power in the power saving mode than in the normal operation mode.

In an embodiment of the present invention, a touch sensitive processing method for switching an electronic system into a normal operation mode upon receiving a touch gesture in a power saving mode is provided. The electronic system includes a host and a power supply module. The host is configured for executing an operating system to control the electronic system in the normal operation mode. The power supply module is configured for supplying power to the host in the normal operation mode and to cut power supply to the host in the power saving mode. The touch sensitive processing method includes: detecting multiple touch events via multiple touch sensitive electrodes on a touch panel; determining whether a power-on command is formed by these touch events; and sending a power-on notification to the power supply module for supplying power to the host and switching to the normal operation mode when the power-on command is formed by these touch events. Accordingly, this embodiment allows the electronic system in a power saving mode to receive touch gestures in order to switch the electronic system into a normal operation mode.

In a variant of the above embodiment, a detection rate for detecting touch events in the power saving mode is lower than a detection rate for detecting touch events in the normal operation mode. Accordingly, as the amount of computation of the touch sensitive processing apparatus is reduced, power required for the touch sensitive electrodes to sense touch events in a unit time is also reduced, this embodiment thus allows the touch sensitive processing apparatus to use less power in the power saving mode than in the normal operation mode.

In a variant of the above embodiment, less touch sensitive electrodes are used for detection in the power saving mode, and more touch sensitive electrodes are used for detection in the normal operation mode. In a variant of the above embodiment, only touch sensitive electrodes within a specific area of the touch panel are used for detection in the power saving mode, and all of the touch sensitive electrodes are used for detection in the normal operation mode. In a variant of the above embodiment, at least every other touch sensitive electrode is used for detection in the power saving mode, and all of the touch sensitive electrodes are used for detection in the normal operation mode. Accordingly, as the amount of touch sensitive electrodes used is reduced, power required for the touch sensitive electrodes to sense touch events is also reduced, this embodiment thus allows the touch sensitive processing apparatus to use less power in the power saving mode than in the normal operation mode.

In a variant of the above embodiment, only gestures of a single finger are detected in the power saving mode, and gestures of multiple fingers are detected in the normal operation mode. Accordingly, as the amount of computation is reduced, this embodiment allows the touch sensitive processing apparatus to use less power in the power saving mode than in the normal operation mode.

In a variant of the above embodiment, the highest voltage of touch sensitive signals provided to the touch sensitive electrodes in the power saving mode is less than the highest voltage of touch sensitive signals provided to the touch sensitive electrodes in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the method further includes using an amplifier for amplifying signals from the touch sensitive electrodes. The gain of the amplifier is smaller in the power saving mode than in the normal operation mode. Accordingly, regardless whether self-capacitive or mutual-capacitive detecting method is used, power required for the touch sensitive electrodes to sense touch events is also reduced, this embodiment allows the touch sensitive processing apparatus to use less power in the power saving mode than in the normal operation mode.

In a variant of the above embodiment, the power-on command is a specific touch gesture defined by a user. Accordingly, this embodiment allows a user to define specific touch gestures for the electronic system to avoid other people switching the electronic system into the normal operation mode using a default touch gesture.

In a variant of the above embodiment, the power-on command is a sequence of the multiple touch events occurred in at least one area. Accordingly, this embodiment allows touch events inputted by a user to be limited to at least one area to reduce the number of touch sensitive electrodes required for detecting the touch events, such that the touch sensitive processing apparatus is capable of using less power in the power saving mode than in the normal operation mode.

What is claimed is:

1. An electronic system for switching to a normal operation mode upon receiving a touch gesture in a power saving mode comprising:
   a host executing an operating system controlling the electronic system in the normal operation mode;
   a power supply module to selectively supply power to the host in the normal operation mode and not supply power to the host in the power saving mode;
   a touch sensitive processing apparatus for receiving power from the power supply module in the power saving mode, the touch sensitive processing apparatus comprising:
      an electrode interface component for connecting with a plurality of touch sensitive electrodes of a touch panel detecting multiple touch events via the multiple touch sensitive electrodes;
      a clock component; and
      a processor determining when a predetermined touch gesture is formed by these touch events, and sending a power-on notification corresponding to the predetermined touch gesture to the power supply module to supply power to the host and switching to the normal operation mode when the predetermined touch gesture is formed by the multiple touch events; and
      a clock generator providing a clock signal to both the host and the touch sensitive processing apparatus, wherein the clock signal is modified by the clock component to provide a modified clock signal to the processor in the power saving mode.

2. The electronic system of claim 1, wherein the clock component provides a first clock signal to the touch sensitive processing apparatus in the power saving mode, and the clock generator provides a second clock signal to the touch sensitive processing apparatus in the normal operation mode, wherein the frequency of the first clock signal is lower than that of the second clock signal.

3. The electronic system of claim 1, wherein a detection rate for detecting touch events for the touch sensitive processing apparatus in the power saving mode is lower than a detection rate for detecting touch events in the normal operation mode.

4. The electronic system of claim 1, wherein the touch sensitive processing apparatus detects only touch gestures of a single finger in the power saving mode, and detects touch gestures of multiple fingers in the normal operation mode.

5. The electronic system of claim 1, wherein the highest voltage of touch sensitive signals provided to the touch sensitive electrodes by the touch sensitive processing apparatus in the power saving mode is less than the highest voltage of touch sensitive signals provided to the touch sensitive electrodes by the touch sensitive processing apparatus in the normal operation mode.

6. The electronic system of claim 1, wherein the touch sensitive processing apparatus further includes an amplifier for amplifying signals from the touch sensitive electrodes, wherein the gain of the amplifier is smaller in the power saving mode than in the normal operation mode.

7. The electronic system of claim 1, wherein the predetermined touch gesture is a specific touch gesture defined by a user.

8. The electronic system of claim 1, wherein the predetermined touch gesture is a sequence of the multiple touch events occurred in at least one area.

9. The electronic system of claim 1, wherein the touch sensitive processing apparatus uses fewer touch sensitive electrodes for detection in the power saving mode than the number of touch sensitive electrodes used for detection in the normal operation mode.

10. The electronic system of claim 9, wherein the touch sensitive processing apparatus uses only touch sensitive electrodes within a specific area of the touch panel for detection in the power saving mode, and uses all of the touch sensitive electrodes for detection in the normal operation mode.

11. The electronic system of claim 9, wherein the touch sensitive processing apparatus uses at least every other touch sensitive electrode for detection in the power saving mode, and uses all of the touch sensitive electrodes for detection in the normal operation mode.

12. A touch sensitive processing apparatus for switching an electronic system into a normal operation mode upon receiving a touch gesture in a power saving mode, the electronic system including a host, a clock generator, and a power supply module, the host executing an operating system controlling the electronic system in the normal operation mode, the clock generator providing a clock signal to both the host and the touch sensitive processing apparatus, the power supply module selectively supplying power to the host in the normal operation mode and not supplying power to the host in the power saving mode, the touch sensitive processing apparatus comprising:
an electrode interface component connecting with a plurality of touch sensitive electrodes of a touch panel, detecting multiple touch events via the multiple touch sensitive electrodes;
a clock component, receiving and modifying the clock signal to provide a modified clock signal to the processor in the power saving mode; and
a processor determining when a predetermined touch gesture is formed by these touch events, and sending a power-on notification corresponding to the predetermined touch gesture to the power supply module to supply power to the host and switching to the normal operation mode when the predetermined touch gesture is formed by the multiple touch events.

13. The touch sensitive processing apparatus of claim 12, wherein the wherein the clock component provides a first clock signal to the touch sensitive processing apparatus in the power saving mode, and the clock generator provides a second clock signal to the touch sensitive processing apparatus in the normal operation mode, wherein the frequency of the first clock signal is lower than that of the second clock signal.

14. The touch sensitive processing apparatus of claim 12, wherein a detection rate for detecting touch events for the touch sensitive processing apparatus in the power saving mode is lower than a detection rate for detecting touch events in the normal operation mode.

15. The touch sensitive processing apparatus of claim 12, wherein the touch sensitive processing apparatus detects only touch gestures of a single finger in the power saving mode, and detects touch gestures of multiple fingers in the normal operation mode.

16. The touch sensitive processing apparatus of claim 12, wherein the highest voltage of touch sensitive signals provided to the touch sensitive electrodes by the touch sensitive processing apparatus in the power saving mode is less than the highest voltage of touch sensitive signals provided to the touch sensitive electrodes by the touch sensitive processing apparatus in the normal operation mode.

17. The touch sensitive processing apparatus of claim 12, further comprising an amplifier for amplifying signals from the touch sensitive electrodes, wherein the gain of the amplifier is smaller in the power saving mode than in the normal operation mode.

18. The touch sensitive processing apparatus of claim 12, wherein the predetermined touch gesture is a specific touch gesture defined by a user.

19. The touch sensitive processing apparatus of claim 12, wherein the predetermined touch gesture is a sequence of the multiple touch events occurred in at least one area.

20. The touch sensitive processing apparatus of claim 12, wherein the touch sensitive processing apparatus uses fewer touch sensitive electrodes for detection in the power saving mode than the number of touch sensitive electrodes used for detection in the normal operation mode.

21. The touch sensitive processing apparatus of claim 20, wherein the touch sensitive processing apparatus uses only touch sensitive electrodes within a specific area of the touch panel for detection in the power saving mode, and uses all of the touch sensitive electrodes for detection in the normal operation mode.

22. The touch sensitive processing apparatus of claim 20, wherein the touch sensitive processing apparatus uses at least every other touch sensitive electrode for detection in the power saving mode, and uses all of the touch sensitive electrodes for detection in the normal operation mode.

23. A touch sensitive processing method switching an electronic system into a normal operation mode upon receiving a touch gesture in a power saving mode, the electronic system including a host, a clock generator, and a power supply module, the host executing an operating system controlling the electronic system in the normal operation mode, the clock generator providing a clock signal to both the host and the touch sensitive processing apparatus, the power supply module selectively supplying power to the host in the normal operation mode and to cut power supply not supplying power to the host in the power saving mode, the touch sensitive processing method comprising:
receiving a clock signal from the clock generator and modifying the clock signal to provide a modified clock signal to the processor in the power saving mode;
detecting multiple touch events via multiple touch sensitive electrodes on a touch panel;
determining whether a predetermined touch gesture is formed by these touch events; and
sending a power-on notification to the power supply module to supply power to the host and switching to the normal operation mode when the predetermined touch gesture is formed by the multiple touch events.

24. The touch sensitive processing method of claim 23, wherein a detection rate for detecting touch events in the power saving mode is lower than a detection rate for detecting touch events in the normal operation mode.

25. The touch sensitive processing method of claim 23, wherein only touch gestures of a single finger are detected in the power saving mode, and touch gestures of multiple fingers are detected in the normal operation mode.

26. The touch sensitive processing method of claim 23, wherein the highest voltage of touch sensitive signals provided to the touch sensitive electrodes in the power saving mode is less than the highest voltage of touch sensitive signals provided to the touch sensitive electrodes in the normal operation mode.

27. The touch sensitive processing method of claim 23, further comprising using an amplifier to amplify signals from the touch sensitive electrodes, wherein the gain of the amplifier is smaller in the power saving mode than in the normal operation mode.

28. The touch sensitive processing method of claim 23, wherein the predetermined touch gesture is a specific touch gesture defined by a user.

29. The touch sensitive processing method of claim 23, wherein the predetermined touch gesture is a sequence of the multiple touch events occurred in at least one area.

30. The touch sensitive processing method of claim 23, wherein fewer touch sensitive electrodes are used for detection in the power saving mode than the number of touch sensitive electrodes used for detection in the normal operation mode.

31. The touch sensitive processing method of claim 30, wherein only touch sensitive electrodes within a specific area of the touch panel are used for detection in the power saving mode, and all of the touch sensitive electrodes are used for detection in the normal operation mode.

32. The touch sensitive processing method of claim 30, wherein at least every other touch sensitive electrode is used for detection in the power saving mode, and all of the touch sensitive electrodes are used for detection in the normal operation mode.

\* \* \* \* \*